United States Patent
Sams et al.

[11] Patent Number: 6,010,634
[45] Date of Patent: Jan. 4, 2000

[54] SYSTEM AND METHOD FOR SEPARATING MINGLED HEAVIER AND LIGHTER COMPONENTS OF A LIQUID STREAM

[75] Inventors: Gary W. Sams; Harry G. Wallace, both of Tulsa, Okla.

[73] Assignee: National Tank Company, Houston, Tex.

[21] Appl. No.: 09/025,144

[22] Filed: Feb. 18, 1998

[51] Int. Cl.⁷ .............................................. B01D 17/028
[52] U.S. Cl. ........................................ 210/801; 516/197
[58] Field of Search .................... 516/138, 197; 210/708, 801, 802

[56] References Cited

U.S. PATENT DOCUMENTS

| | | | |
|---|---|---|---|
| 675,276 | 5/1901 | Hanson | 210/801 X |
| 1,660,230 | 2/1928 | Monger | 516/197 X |
| 2,751,998 | 6/1956 | Glasgow | 210/708 X |
| 3,529,719 | 9/1970 | Graybill | 516/138 X |
| 4,396,508 | 8/1983 | Broughton | 210/802 X |
| 5,248,439 | 9/1993 | Derrell | 210/708 |
| 5,637,234 | 6/1997 | McCasland | 210/801 |
| 5,762,810 | 6/1998 | Pelton | 210/802 X |

OTHER PUBLICATIONS

National Tank Company "Treater Design Manual"; pp. C.400–TM–1 through C.400–TM–4; dated Jul. 1, 1997.

*Primary Examiner*—Richard D. Lovering
*Attorney, Agent, or Firm*—Head Johnson & Kachigian

[57] ABSTRACT

A system and method of use thereof for separating commingled heavier and lighter components of a liquid stream, employing a vessel having a liquid inlet, a lighter component outlet communicating with an interior upper portion of the vessel and a heavier component outlet communicating with an interior lower portion of the vessel, a distribution conduit positioned within the vessel in communication with the liquid inlet and having a plurality of spaced apart small diameter openings through which liquid is discharged as small streams and at least one momentum attenuator supported within the vessel adjacent the distribution conduit and configured to intercept the small streams to dissipate the kinetic energies thereof.

17 Claims, 4 Drawing Sheets

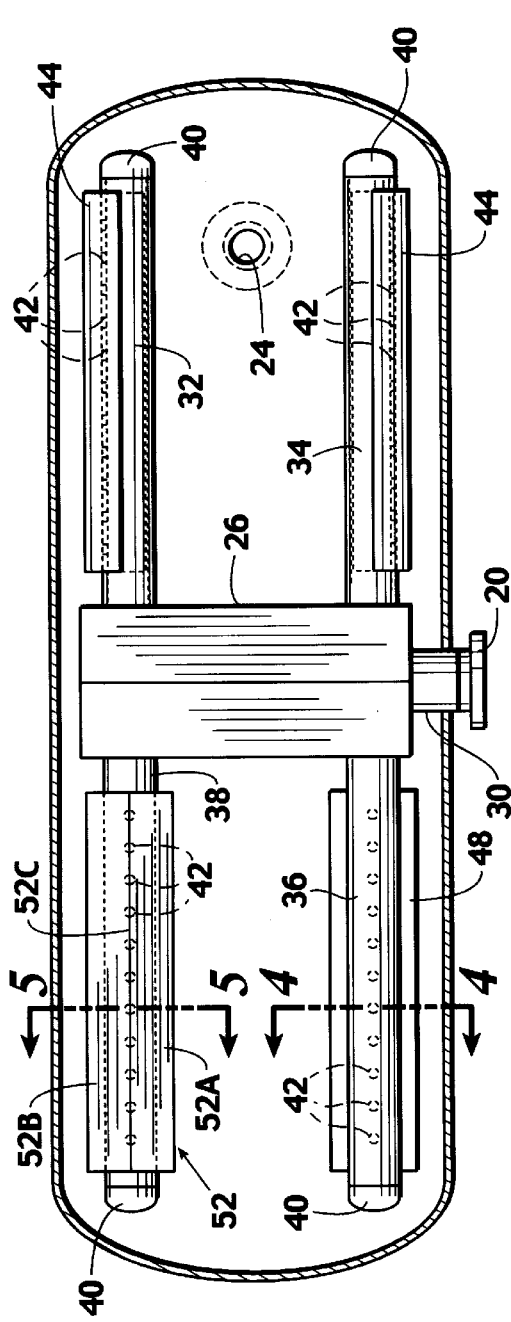
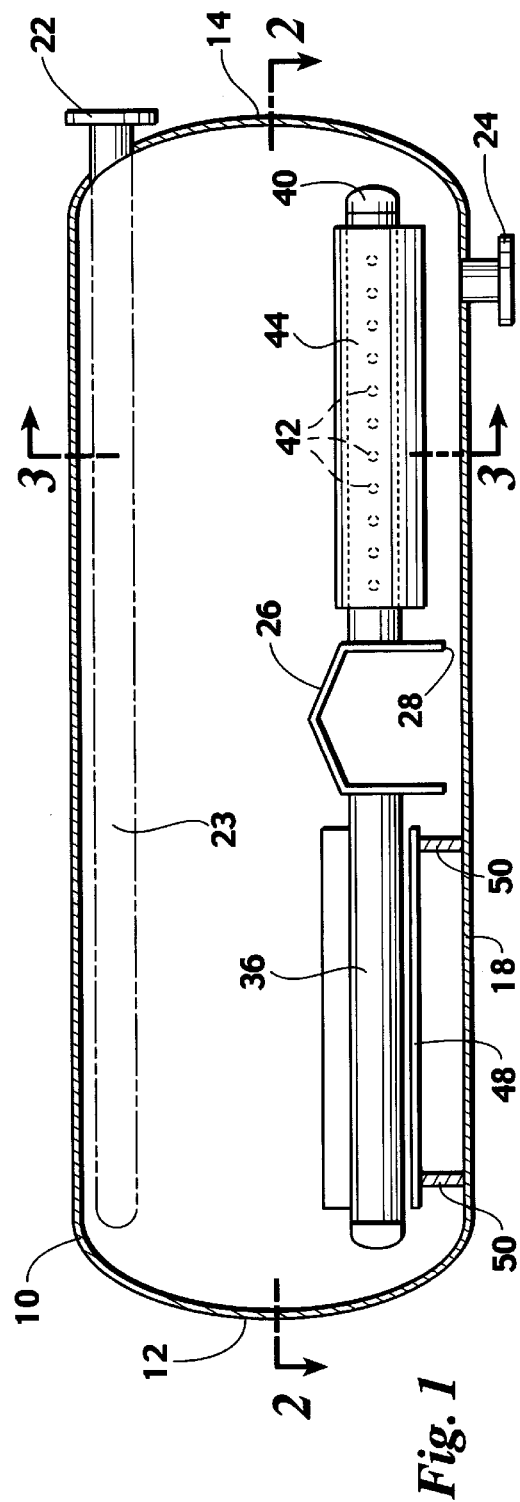
Fig. 2
Fig. 1

SYSTEM AND METHOD FOR SEPARATING MINGLED HEAVIER AND LIGHTER COMPONENTS OF A LIQUID STREAM

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

Numerous industries require systems to separate liquids of different densities and most separation processes rely on vertical movement of liquids in a large vessel. Most large vessels used for liquid separation are elongated, horizontal and cylindrical in shape. Liquid distribution in the lower portion of a horizontal, cylindrical vessel is normally accomplished using either a perforated pipe-type spreader or a perforated open bottom box-type spreader. Several techniques are typically used to improve liquid distribution along and across the vessel cross-sectional area. These techniques include proper sizing of the flow channels, proper selection of the spreader hole sizes, proper lengths of the spreader pipe, proper dimensions of a box and spreader configuration, and the proper selection of the basic spreader design, such as H-type laterals, T-type laterals, and S-shaped pipe distributors, among others.

The efficiency of a separation process depends to a great extent on the proper distribution of liquids within the separation vessel. Proper distribution is, in turn, largely a function of the kinetic energy of the liquid streams as they are released into the separation vessel. If the liquid released into a separation vessel has a high kinetic energy when discharged from a spreader, the resulting parasitic movement of liquids within the vessel can dramatically reduce the efficiency of separation.

Typically, when liquids are discharged from holes in a spreader in a vessel, the liquid will continue in a straight line until it is deflected by an internal surface, such as the vessel wall. If an unrestricted liquid flow is allowed to continue for a prolonged period of time, it will induce a second or parasitic flow within the vessel which contributes to ineffective liquid distribution within the vessel and reduced efficiency of separation.

An objective of this invention is to provide a system and method of use thereof that achieves more efficient liquid separation by reducing the kinetic energy of liquids distributed within a separation vessel and attenuates the momentum of liquid streams as they are introduced so as to substantially reduce the creation of parasitic flow streams.

For background material relating to this subject, reference may be had to a manual published by National Tank Company entitled "Treater Design Manual" and particularly Section C.400 entitled "Spreaders and Collectors" having been issued on Jul. 1, 1997. Pages C.400 TM-1 through TM-4 of this manual are incorporated herein by reference.

BRIEF SUMMARY OF THE INVENTION

The invention is a system and method of use thereof for separating heavier and lighter components of a liquid stream. The essence of a system for practicing the invention for separating mingled heavier and lighter components of a liquid stream include the use of a vessel having a liquid inlet, a lighter component outlet communicating with an interior upper portion of the vessel and a heavier component outlet communicating with an interior lower portion of the vessel. A distribution conduit is positioned within the vessel and has communication with the liquid inlet. The distribution conduit has a plurality of spaced apart small dimensioned openings through each of which liquid is discharged as a small stream.

Positioned adjacent the distribution conduit is a momentum attenuator. The momentum attenuator is closely spaced from the distribution conduit and in alignment with the stream direction to intercept the small streams to dispel the kinetic energies thereof.

In a typical application of the invention, but by no means a limited application, a treatment vessel is circular in cross-section, is elongated, and is horizontally positioned. At least one distribution conduit is employed within the horizontal vessel, the distribution conduit also being typically circular in cross-section and has a plurality of small dimensioned spaced apart holes therein. The holes are typically circular in cross-section. One effective type of momentum attenuator is an elongated length of pipe that is semi-circular in cross-section, such as a length of pipe that has been cut into two pieces. The diameter of the semi-circular momentum attenuator is preferably greater than the diameter of the distribution conduit. The momentum attenuator is positioned adjacent to but spaced from the distribution conduit. The stream direction of the small streams discharged from the distribution conduit intercept the concave area defined by the semi-circular cross-sectioned momentum attenuator. By spacing the cross-section momentum attenuator adjacent the pipe, an annular area is created in which the kinetic energies of the small streams of liquid are substantially attenuated, allowing the inlet liquid to be dispersed within the vessel in a way to minimize the creation of parasitic flow paths and to establish an environment that is most conducive to a separation of the lighter and heavier components.

In other embodiments the momentum attenuator may be a flat plate, or may have, in cross-sections perpendicular the length thereof, a V-shaped configuration.

The distribution conduit arrangement within a vessel can vary. In one embodiment a doghouse type containment structure is positioned centrally within an elongated horizontal vessel to which is connected the liquid inlet. Extending from the doghouse shaped containment structure is a number of distribution conduits each in combination with an adjacent momentum attenuator.

One application of the invention is in a separation vessel having a weir arrangement in one section. In this arrangement, the elongated horizontal vessel is divided by an interior wall defining an inlet section and an outlet section. Within the inlet section a weir is established over which lighter components of the liquid flow. After passing over the top of a weir, the liquid passes through an opening in the partition wall. Connected to the opening is a distribution conduit having spaced apart small diameter discharge openings and a momentum attenuator plate positioned adjacent to it. In this arrangement, the initial separation of heavier and lighter components of a commingled liquid stream takes place in the inlet section of the separator vessel and a second stage of separation takes place in the outlet section where the improved distributor conduit/momentum attenuator system is employed.

A better understanding of the invention will be obtained from the following description of the preferred embodiments, taken in conjunction with the attached drawings and claims.

BRIEF DESCRIPTION OF THE DRAWINGS

FIG. 1 is a diagrammatic elevational cross-sectional view of a vessel employed in a system for separating commingled heavier and lighter components of a liquid stream. The vessel is typically elongated and cylindrical and is shown having a doghouse distribution structure therein with four elongated distribution conduits extending from it. FIG. 1 shows a vessel lighter component outlet and a heavier component outlet but does not show the vessel liquid inlet.

FIG. 2 is a horizontal cross-sectional view taken along the line 2—2 of FIG. 1 and shows the liquid inlet. In the vessels of FIGS. 1 and 2, three different types of momentum attenuators are illustrated.

FIG. 3 shows a liquid interface positioned within the vessel generally below the distribution conduits.

DETAILED DESCRIPTION OF THE PREFERRED EMBODIMENTS

Figure 3:
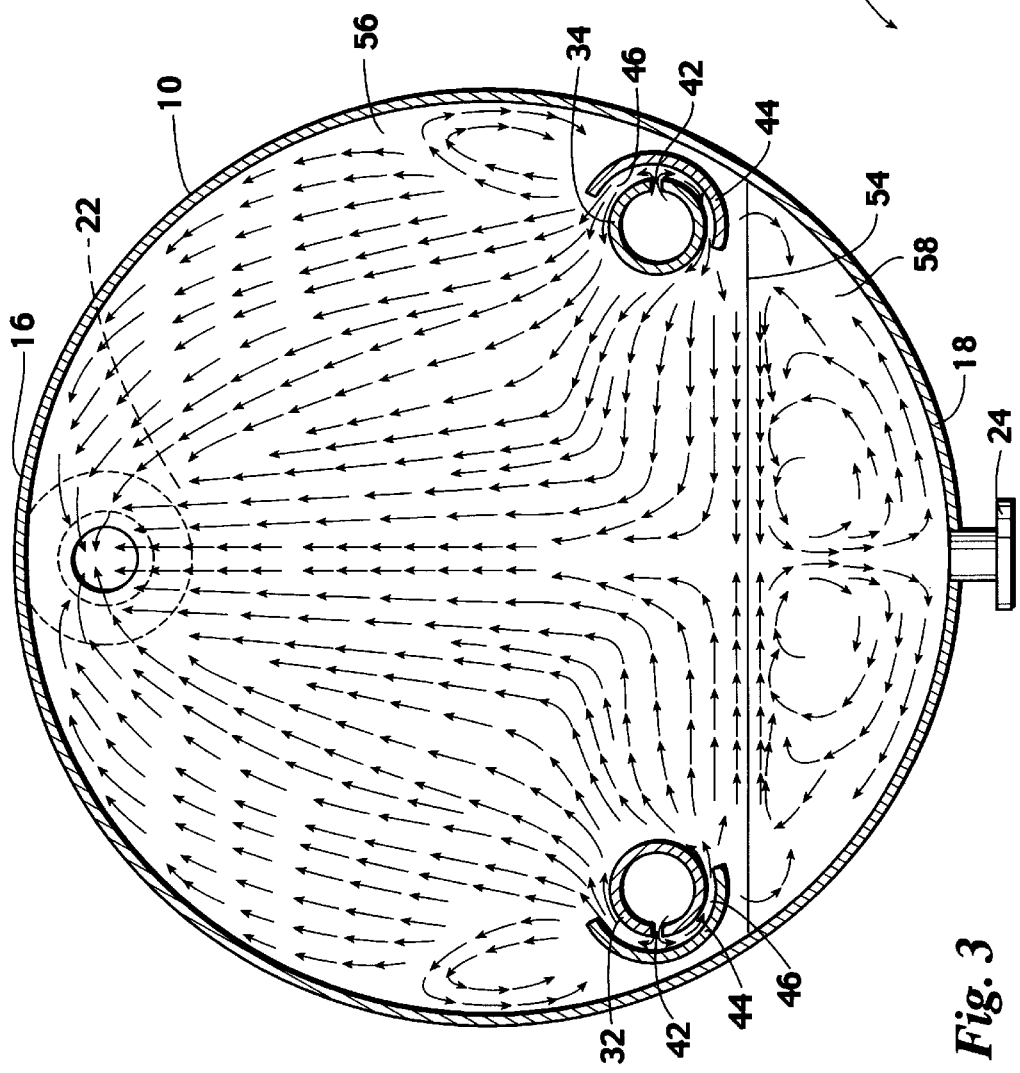
FIG. 3 is an elevational cross-sectional view taken along the line 3—3 of FIG. 1 showing the interior of the vessel with the two distribution conduits and with two semi-circular momentum attenuators. A typical liquid flow path pattern is shown by arrows.

Referring to the drawings and first to FIGS. 1, 2 and 3, a system for practicing the methods of this invention is illustrated. The invention will be described as it is employed in a typical separation vessel that is circular in cross-section, elongated and horizontal, it being understood that the cross-sectional configuration of the vessel, its relative lengths to width, and orientation are not critical elements in this invention.

A distribution vessel is indicated generally by the numeral 10 and has a cylindrical sidewall with a first end 12 and second end 14. As seen in FIG. 3, the cylindrical sidewall provides a vessel top 16 and bottom 18. An inlet 20, seen in FIG. 2, is provided by which a commingled liquid stream of heavier and lighter components is introduced into the interior of the vessel. The purpose of the separator vessel is to create an environment in which, by force of gravity, heavier and lighter components will separate from each other to be separately withdrawn from the vessel. For this purpose, a lighter component outlet 22 is provided in the vessel that communicates with an interior upper portion of the vessel and a heavier component outlet 24 communicates with the vessel interior lower portion.

In the embodiments of FIGS. 1 and 2 a doghouse distribution structure 26 is employed. This doghouse inlet structure provides a space within vessel 10 that is closed on the top, sides and ends but has an open bottom 28. Liquid inlet 20 communicates with the interior of doghouse distributor structure 26 by means of a short length of conduit 30.

Extending from doghouse distribution structure 26 are four distribution conduits indicated by the numerals 32, 34, 36 and 38 and identified as first, second, third and fourth distribution conduits. Each of the conduits are closed at their outer ends such as by pipe caps 40, and each extends horizontally within vessel 10. Each distribution conduit has a plurality of spaced apart small dimensioned discharge openings 42. Positioned immediately adjacent to each of the distribution conduits, (as clearly illustrated in the drawings) is a momentum attenuator which can be of various configurations as will be described.

FIG. 3 shows vessel 10 in enlarged cross-sectional scale with distribution conduits 32 and 34 in cross-section, each distribution conduit having small dimensioned openings 42. Positioned immediately adjacent each of conduits 32 and 34 is a momentum attenuator 44 that is of semi-circular configuration. Semi-circular cross-sectional momentum attenuators 44 can be manufactured by cutting a length of cylindrical pipe longitudinally into two sections although momentum attenuators 44 are not necessarily precisely semicircular. Momentum attenuators 44 are positioned adjacent to but spaced from distribution conduits 32 and 34 providing annular areas 46 between the exterior of each distribution conduit and its adjacent momentum attenuator. In the arrangement shown in FIG. 3 the semi-circular momentum attenuators 44 are positioned asymmetrically with respect to distribution conduits 32 and 34 so that the annular area 46 is not symmetrical, however, it can be seen that if desired a semi-circular momentum attenuators can be positioned symmetrically with a cylindrical distribution conduit to thereby provide a symmetrical annular area 46.

Each of the semi-circular momentum attenuators can be varied in its geometrical relationship with a distribution conduit. In the arrangement illustrated, each semi-circular momentum attenuator 44 is oriented so that the spacing with its associated distribution conduit is greater at the top, that is towards the top 16 of vessel 10 than at the bottom so as to direct a major portion of the liquid flow emanating from small dimensioned openings 42 primarily in an upper direction but nevertheless maintaining liquid flow towards the center of the vessel from below distribution conduits 32 and 34. An arcuate or semi-circular momentum attenuator, such as 44 as shown in FIG. 3, lends itself to various geometrical relationships with respect to a cylindrical distribution conduit. In addition, the point of intersection of the vector tangent of a liquid flow stream emanating from an opening 42 with a momentum attenuator can be varied. The center of curvature of the momentum attenuator relative to the cylindrical axis of distribution conduit may be either concentric or, as shown in FIG. 3, offset with respect to each other. This enables the engineer designing a system for separating components of a liquid stream to arrange the system to achieve optimum liquid separation in accordance with the characteristics of the liquids being separated.

Figure 4:
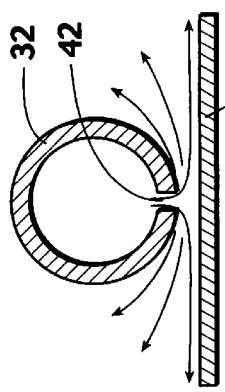
FIG. 4 is an enlarged fragmentary cross-sectional view taken along the line 4—4 of FIG. 2 showing a momentum attenuator in the form of a flat plate positioned adjacent a circular distribution conduit.

FIG. 4 shows an alternate embodiment of the invention wherein the momentum attenuator is in the form of a flat plate 48. The use of a flat plate attenuator 48 is illustrated in the lower left hand portion of FIG. 2 and is seen elevationally in FIG. 1. In these views flat plate momentum attenuator 48 is supported by blocks 50 that rests on the interior of vessel bottom 18. The small dimensioned openings 42 in third distributor conduit 36 as seen in FIGS. 2 and 4 are positioned on the bottom of the distribution conduit so that flat plate attenuator 48 lies horizontally within vessel 10. This arrangement is optional as flat plate momentum attenuator 48 could be used vertically if the distribution conduit with which it is associated has the small dimensioned openings 42 arranged to expel liquid in vectors extending horizontally of the vessel.

As previously stated, flat plate momentum attenuator 48 as shown in FIG. 1 is supported by blocks 50. As an alternative, metal brackets (not shown) could be welded to the exterior of distribution conduit 36 to support plate 48. In like manner, each semi-circular momentum attenuator 44 can be supported either from the sidewall of vessel 10 or from brackets extending from the surface of the distribution conduit with which it is associated. The specific way of supporting momentum attenuators 44 is not shown since such would be well within the skill of the practitioner that designs and constructs vessels for liquid separation.

Figure 5:
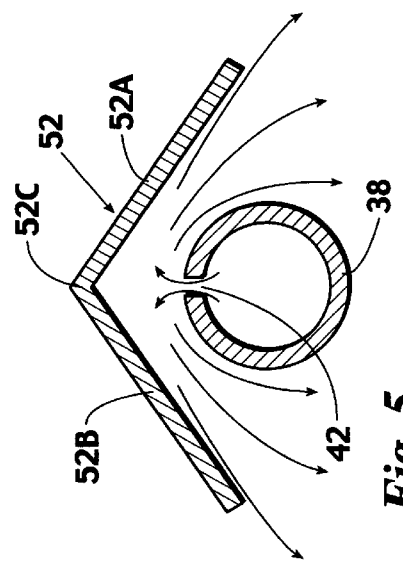
FIG. 5 is a fragmentary cross-sectional view, enlarged, taken along the line 5—5 of FIG. 2 showing a different type of momentum attenuator.

A third type of momentum attenuator is shown in FIGS. 2 and 5. In this arrangement the attenuator is of a V-shaped cross-sectional arrangement and is identified by the numeral 52. This attenuator is formed of flat plates 52A and 52B joined at an apex 52C. The plates 52A and 52B may be welded to each other at the apex 52C or the V-shaped attenuator may be formed of a unitary length of metal bent into the form illustrated. Further, the momentum attenuators do not of necessity have to be constructed of metal. Where the flow velocity and characteristic of the liquid components being separated permit, the momentum attenuators can be, in some instances, formed of non-metallic material, such as plastic or fiberglass although in the traditional application for treating commingled liquids in the processing industry, particularly in the hydrocarbon industry, the momentum attenuators will normally be formed of metal.

As seen in FIGS. 2 and 5, the V-shaped attenuator 52 is positioned paralleled to and above fourth distributor conduit 38 with small dimensioned openings 42 being oriented to direct the flow streams vertically upward. This is by way of example only as the V-shaped attenuator 52 could be oriented horizontally with respect to a distribution conduit or positioned below the distribution conduit according to the needs of the engineer designing the separation vessel.

The drawings thus illustrate three different types of momentum attenuators, that is, a semi-circular or arcuate cross-sectioned attenuator 44, a flat plate attenuator 48 and a V-shaped attenuator 52. These are representative of other cross-sectional designs that may be employed within the scope of the invention.

FIG. 3 illustrates by a large number of arrows representative flow paths of a commingled stream entering vessel 10 and show how momentum attenuators 44 are instrumental in modifying the flow paths.

FIG. 3 shows a horizontal liquid interface 54 positioned within the vessel and below distribution conduits 32 and 34. An interface illustrated by 54 is sometimes employed in separator vessels provides separation between an upper portion 56 of the vessel interior from a lower portion 58 to separate the area in which the heavier liquid component accumulates from the area in which the lighter liquid component accumulates. The location of the liquid interface is generally controlled by a level controller (not shown but well known in industry). The intended function of the distribution conduit/momentum attenuator relationship does not change with interface 54 location, however, a designer employing the principals set forth herein may reorient the position of the distribution conduits and momentum attenuators depending on whether or not the interface is above or below the conduit.

Figure 6:
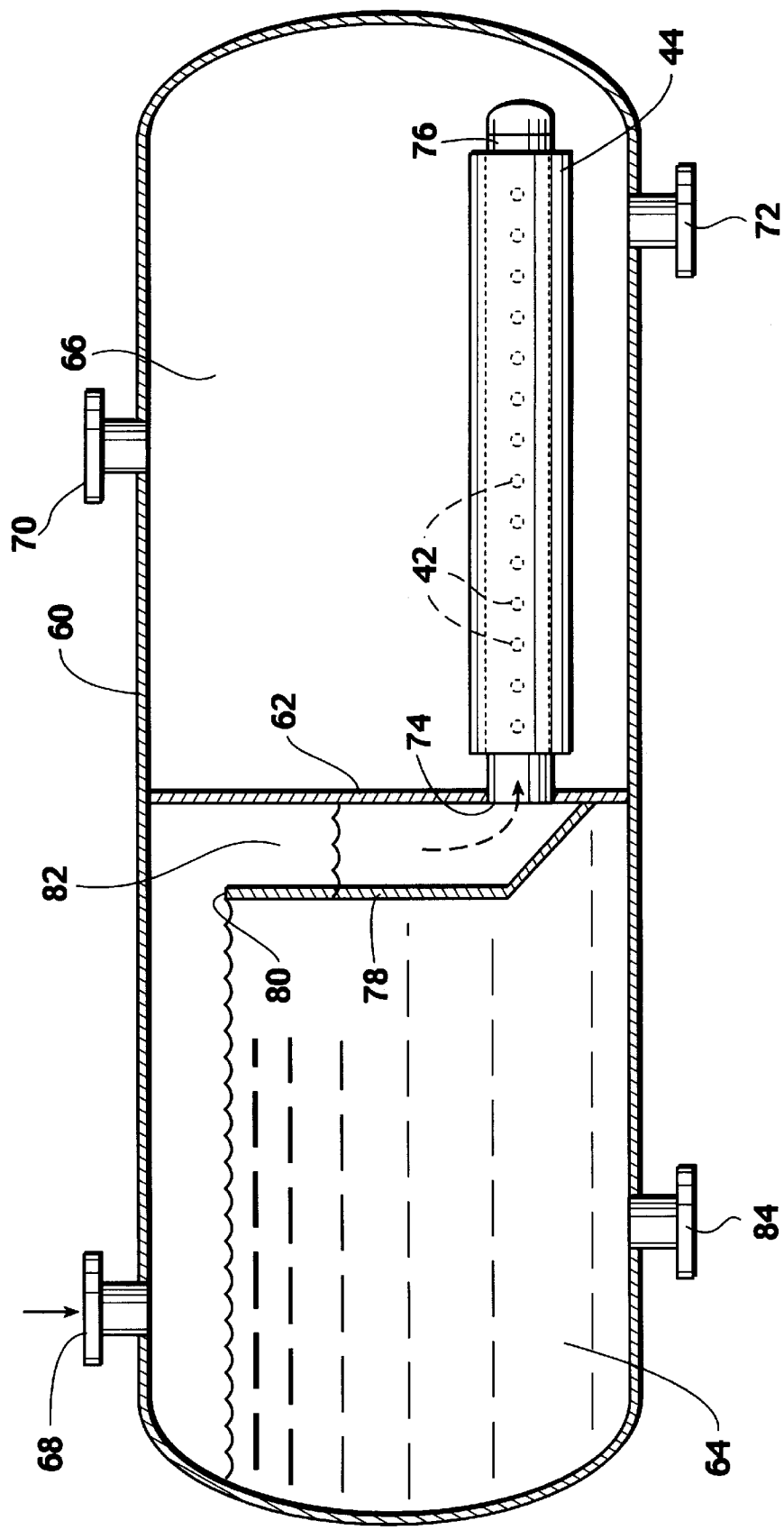
FIG. 6 is an elevational cross-sectional view of an embodiment of the invention in which the separator vessel is internally divided by a vertical wall providing a vessel inlet section and an outlet section. In the inlet section, with which a liquid inlet communicates, an overflow weir is provided. Liquid flowing over the weir is passed through an opening in the vertical wall to a horizontally positioned distribution conduit placed in the vessel outlet section. Affixed adjacent to the distribution conduit is a momentum attenuator. A cross-section taken of the outlet section of FIG. 6 would have essentially the same appearance as FIG. 3 when two paralleled distribution conduits are employed, each having its associated momentum attenuator.

FIG. 6 illustrates the principles of this invention applied to a different separator system in which a vessel 60, which is elongated, horizontal and of circular cross-section, has a vertical partition wall 62 therein that divides the interior of the vessel into an inlet section 64 and an outlet section 66. A commingled liquid inlet 68 feeds liquid having heavier and lighter components into inlet section 64 while a lighter component outlet 70 and a heavier component outlet 72 extend from the vessel outlet section 66.

Partition 62 has an opening 74 therein that connects with a distribution conduit 76. Adjacent distribution conduit 76 is a momentum attenuator 44 that is semi-circular as illustrated in FIG. 3.

Positioned within the vessel inlet section 64 is an overflow weir 78 having an upper is edge 80. As liquid accumulates within inlet section 64 the level of the liquid rises until it reaches upper edge 80 and overflows the weir into a discharge area 82 that communicates with opening 74 and thereby to distribution conduit 76. Inlet section 74 is provided with a heavier component outlet 84.

As a liquid mixture is fed through inlet 68, the lighter component that is separated from the mixture rises to the top and overflows the upper edge 80 of weir 78, into discharge area 82 and through opening 74 into discharge conduit 76. Discharge conduit 76 has small area openings 42 as has been described with reference to FIGS. 1 through 3 so that the flow through the small diameter openings impinge upon momentum attenuator 44. Liquid separation then is completed in vessel outlet section 66 with the lighter component being discharged out of the vessel through outlet 70 and the heavier component passing out of the vessel through heavier component outlet 72. Thus, the arrangement of FIG. 6 provides two heavier component outlets 72 and 84 and if desired, these can be interconnected. Alternatively, an opening (not shown) can be provided in wall 62 below weir 78 to interconnect the lower portions of inlet section 64 and outlet section 66 so that only one heavier liquid outlet is required.

In FIG. 6 two distribution conduits (not seen) can be employed so that a cross-sectional view taken perpendicular the length of vessel 60 in the area of outlet section 66 would have substantially the appearance of FIG. 3.

FIG. 6 illustrates the fact that the principles of this invention can be employed in a variety of separator vessel designs and in which the unique concepts disclosed herein can be used in combination with other liquid separation techniques well known in the industry.

Figure 8:
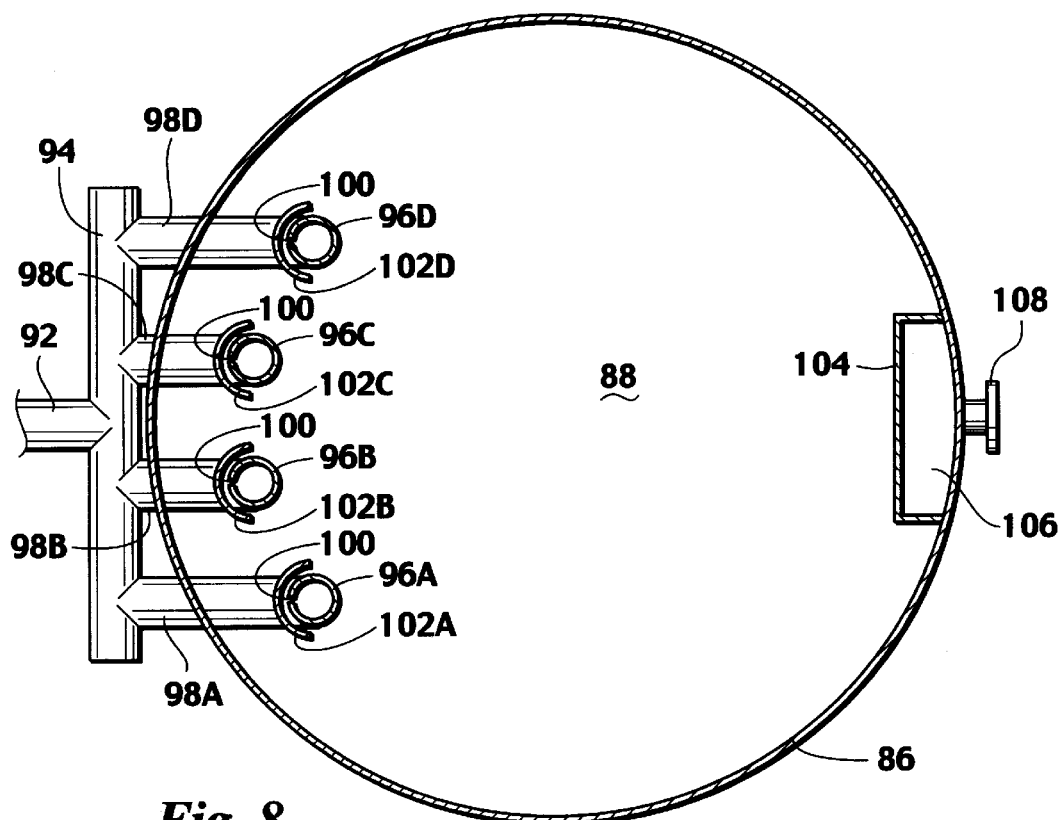
FIG. 8 is a horizontal cross-sectional view of a cylindrical upright vessel taken along the line 8—8 of FIG. 7 and showing four vertically oriented distribution conduits each with a vertically oriented semi-circular momentum attenuator.
Figure 7:
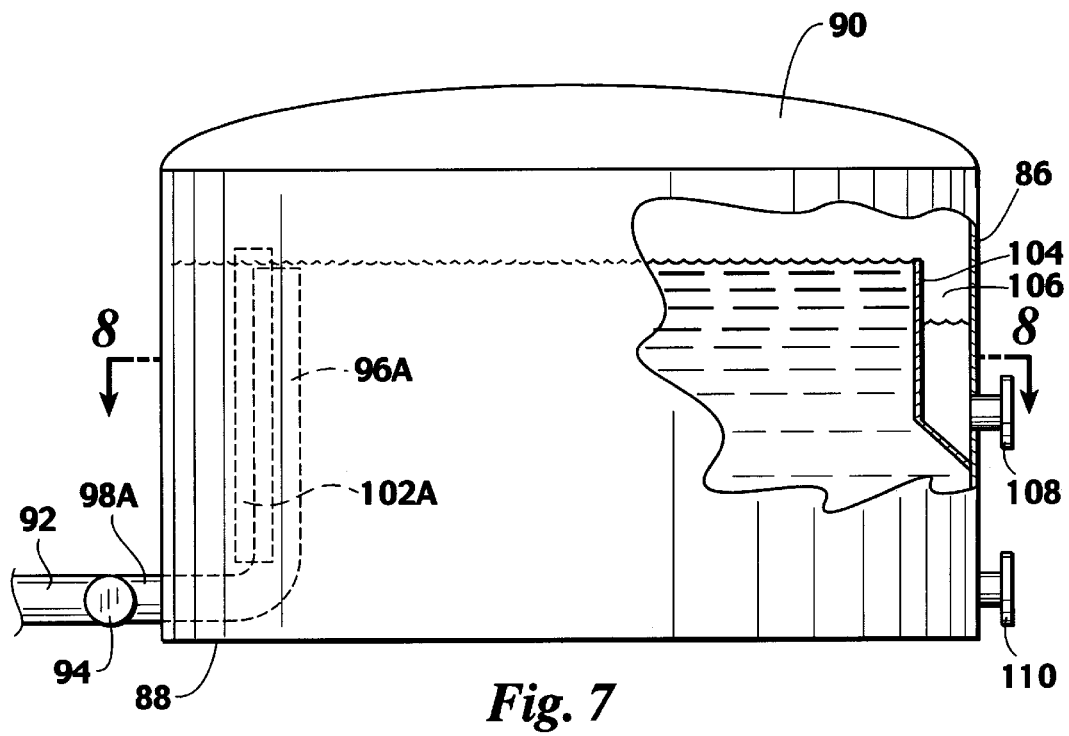
FIG. 7 is an elevational view, shown partially cut away of a cylindrical upright vessel for separating heavier and lighter liquid components and illustrating a system for practicing the invention in which distribution conduits and momentum attenuators are vertically oriented.

FIGS. 7 and 8 illustrate an alternate arrangement for practicing the invention. FIG. 7 shows an upright cylindrical vessel and FIG. 8 is a horizontal cross-sectional view taken of the vessel. The vessel has an upright cylindrical sidewall 86 with a closed bottom 88 and top 90. Liquid enters vessel 86 from a pipe 92 connected to a manifold 94 which in turn is connected to four distribution conduits 96A through 96D, the distribution conduits extending vertically upwardly from adjacent the tank bottom 88 towards tank top 90. As shown in FIG. 8, manifold 94 is connected with each of the distribution conduits by a short length connecting conduit 98A through 98D by which inlet fluid is conveyed from pipe 92 through manifold 94 to the interior of the distribution conduits. The illustration of the manifold 94 and distribution conduit 96A through 96D is merely by way of example as many other piping arrangements can be employed for conveying inlet fluid to vertical distribution conduits 96A through 96D. The illustrated method by which commingled liquid is conveyed to the interior of distributor conduits 96A through 96D is not relevant and is not a part of this invention. Further, the number and placements of the distributor conduits can vary in many ways. FIGS. 7 and 8 disclose the application of the invention in which the distributor conduits are arranged vertically rather than horizontally as in FIGS. 1 through 6.

Each of the distribution conduits has spaced-apart small diameter openings 100 therein in the same manner that small diameter openings 42 are provided in distributor pipe 34 of FIGS. 1 and 2. Positioned adjacent each of the distributor conduits and oriented to receive the flow of fluid emanating from small diameter openings 100 are semi-circular momentum attenuators 102A through 102D. The geometrical relationship between momentum attenuators 102A through 102D in FIGS. 7 and 8 is substantially identical to the arrangement of the semi-circular momentum attenuators 44 with reference to distributor conduits 32 and 34 as illustrated in FIG. 3, the basic difference is that in FIGS. 7 and 8 the combination of distributor pipes and momentum attenuators are vertically arranged.

The combination distributor pipe/momentum attenuator system of FIGS. 7 and 8 functions as has been previously described with reference to the embodiments of FIGS. 1 through 6, that is, commingled liquid is discharged into the interior of vessel 86 by way of small streams, the momentum of fluid flow being quickly intercepted by closely spaced momentum attenuators so that the introduction of commingled fluid into vessel 86 is carried out in such a way as to reduce turbulence to thereby augment the gravitational separation of heavier and lighter components.

As seen in FIG. 8, in a portion of vessel 86 positioned on the interior sidewall opposite distributor conduits 96A through 96D is a weir 104 providing a lighter fluid component discharge area 106 within the vessel, discharge area 106 being connected to a lighter component outlet 108. Connected to an interior lower portion of vessel 86 is a heavier component outlet 110.

FIGS. 1 through 6 illustrate arrangements of the system for practicing the method of the invention wherein the distributor conduits and momentum attenuators are arranged horizontally while FIGS. 7 and 8 illustrate how the invention can be practiced with the distributor conduits and momentum attenuators arranged vertically. It should also be understood that the invention can be practiced with distributor conduits and associated momentum attenuators arranged at any angle between horizontal and vertical.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A system for separating commingled heavier and lighter components of a liquid stream, comprising:

a vessel containing liquid, having a liquid inlet, a lighter liquid component outlet communicating with an interior upper portion of the vessel and a heavier liquid component outlet communicating with an interior lower portion of the vessel;

at least one distribution conduit positioned within said vessel, each submerged within said liquid, each having communication with said liquid inlet and each having a plurality of spaced apart small dimensioned discharge openings through which liquid is discharged in a plurality of discrete small streams; and a momentum attenuator supported within said vessel immediately adjacent and in close proximity to each said distribution conduit and each momentum attenuator being configured to intercept at least a substantial portion of said discrete small streams to redirect each flow stream and to quickly dissipate the kinetic energies thereof and attenuate the momentum of said small streams as they are introduced into said vessel.

2. A system for separating commingled heavier and lighter components of a liquid stream according to claim 1 wherein at least one of said distribution conduits is elongated and at least generally circular in cross-section and wherein said momentum attenuator associated with said elongated distribution conduit is elongated and, in cross-section perpendicular to the length thereof, is substantially semi-circular.

3. A system for separating commingled heavier and lighter liquid components of a liquid stream according to claim 2 wherein said at least substantially semi-circular momentum attenuator is positioned to provide a semi-annular space with said elongated distribution conduit.

4. A system for separating commingled heavier and lighter components of a liquid stream according to claim 1 wherein at least one of said distribution conduits is elongated and wherein said momentum attenuator associated therewith is an elongated substantially flat plate closely spaced to said at least one distribution conduit and aligned so that at least a substantial portion of said small streams impinge immediately upon the flat plate.

5. A system for separating commingled heavier and lighter components of a liquid stream according to claim 1 wherein at least one of said distribution conduits is elongated and wherein said momentum attenuator associated therewith is an elongated plate that is substantially V-shaped in cross-section providing a concave side, the V-shaped plate being spaced in close proximity to said elongated distribution conduit and aligned so that at least a substantial portion of said small streams immediately intersect said elongated plate concave side.

6. A system for separating commingled heavier and lighter components of a liquid stream according to claim 1 wherein said vessel is elongated with the length thereof being at least substantially horizontal and including an at least substantially horizontal interface positioned adjacent to but spaced above an interior bottom wall of the vessel dividing the vessel interior into an upper and a lower portion, said at least one distribution conduit and said close proximity momentum attenuator associated therewith being above the interface in the vessel upper portion, said heavier component outlet communicating with the vessel interior lower portion below the interface, liquid communication being provided between the vessel interior upper and lower portions.

7. A system for separating commingled heavier and lighter components of a liquid stream according to claim 1 wherein said vessel is elongated and at least substantially horizontal in length and including:

a doghouse distribution structure positioned within said vessel, the distribution structure having a closed upper portion and an open bottom that is positioned above an interior bottom of the vessel providing free communication between the interior of the distribution structure and the vessel interior through the open bottom, said vessel liquid inlet communicating with the interior of the distribution structure, and wherein said at least one distribution conduit has an inlet end in communication with the interior of the distribution structure.

8. A system for separating commingled heavier and lighter components of a liquid stream according to claim 7 including a plurality of said distribution conduits each with an immediately adjacent said momentum attenuator within said vessel, each distribution conduit having an inlet end in communication with the interior of said distribution structure.

9. A system for separating commingled heavier and lighter components of a liquid stream according to claim 1 wherein said vessel is elongated and at least substantially horizontal and includes, intermediate its length;

a partition having a vertical tangent dividing the interior of the vessel into horizontally disposed inlet and outlet sections, said liquid inlet communicating with the inlet section, said lighter liquid component outlet communicating with an upper portion of the vessel outlet section and said heavier liquid component outlet communicating with a lower portion of the outlet section; and an overflow weir positioned in said vessel inlet section communicating by way of an opening through said partition with a said at least one distribution conduit positioned in a said vessel outlet section, said momentum attenuator being supported adjacent each said distribution conduit within said vessel outlet section.

10. A method of separating commingled heavier and lighter components of a liquid stream, comprising:

introducing commingled liquid into at least one distribution conduit submerged within liquid within an interior of a vessel;

passing liquid from within each of said distribution conduits into said vessel through a plurality of small dimensioned openings to provide a plurality of small liquid streams;

quickly changing the direction of flow and attenuating, the momentum of said small liquid streams passing into said vessel from said small dimensioned openings to substantially dissipate kinetic energies thereof; and withdrawing, heavier components from a lower portion of said vessel and lighter components from an upper portion of said vessel.

11. A method of separating commingled heavier and lighter components of a liquid stream according to claim 10 wherein said distribution conduit is elongated, at least generally circular in cross-section and wherein said step of attenuating the momentum of liquid streams passing into the vessel includes positioning a momentum attenuator that is elongated and, in cross-section perpendicular to the length thereof, at least substantially semi-circular, immediately adjacent to and slightly spaced from each said distribution conduit and in alignment with said small dimensioned openings therein.

12. A method of separating commingled heavier and lighter components of a liquid stream according to claim 11 including the step of positioning a said at least substantially semi-circular momentum attenuator to provide a semi-annular space with each said distribution conduit.

13. A method of separating commingled heavier and lighter components of a liquid stream according to claim 10 wherein each said distribution conduit is elongated and wherein said step of attenuating the momentum of small liquid streams passing into said vessel includes positioning a momentum attenuator in the form of an elongated substantially flat plate closely spaced from each said distribution conduit and aligning each substantially flat plate so that said small streams immediately impinge upon it.

14. A method of separating commingled heavier and lighter components of a liquid stream according to claim 10 wherein said at least one distribution conduit is elongated and wherein said step of attenuating the momentum of small liquid streams passing into said vessel includes positioning a momentum attenuator in the form of an elongated plate that is substantially V-shaped in cross-section providing a concave side, the step of positioning including placing a V-shaped plate closely spaced from said distribution conduit and in alignment with said small streams to cause said small streams to immediately intersect a said elongated plate concave side.

15. A method of separating commingled heavier and lighter components of a liquid stream according to claim 10 wherein said vessel is elongated with the length thereof being at least substantially horizontal including a substantially horizontal interface adjacent to but spaced above an interior bottom wall of said vessel dividing said vessel interior into an upper and a lower portion and positioning said at least one distribution conduit and closely spaced momentum attenuator associated therewith above the interface in an upper portion of said vessel, said heavier liquid components being withdrawal from an interior lower portion of the vessel below the interface and said lighter liquid components being withdrawal from an upper portion of the vessel.

16. A method of separating commingled heavier and lighter components of a liquid stream according to claim 10 wherein said vessel is elongated and at least substantially horizontal in length and including the step of positioning a doghouse distribution structure within the vessel, the distribution structure having a closed upper portion and an open bottom that is positioned above an interior bottom of said vessel providing free communication between the interior of the distribution structure and said vessel interior through the open bottom, the commingled liquid being introduced into the distribution structure, and connecting an inlet end of at least one said distribution conduit in communication with the interior of the distribution structure.

17. A method of separating commingled heavier and lighter components of a liquid stream according to claim 16 including the step of positioning a plurality of said distribution conduits within said vessel, each having associated therewith an immediately adjacent momentum attenuator, and connecting an inlet end of each in communication with the interior of said distribution structure.

* * * * *